United States Patent
Haile et al.

(10) Patent No.: US 10,508,810 B2
(45) Date of Patent: Dec. 17, 2019

(54) THERMAL PANEL WITH A CORRUGATED CERAMIC COMPOSITE SHEET HAVING UNEQUAL RIDGE WIDTHS

(71) Applicant: Hexcel Corporation, Dublin, CA (US)

(72) Inventors: Merid Haile, Phoenix, AZ (US); Earl Ayle, Chandler, AZ (US); Whitney Dailey, Gilbert, AZ (US)

(73) Assignee: HEXCEL CORPORATION, Dublin, CA (US)

( * ) Notice: Subject to any disclaimer, the term of this patent is extended or adjusted under 35 U.S.C. 154(b) by 220 days.

(21) Appl. No.: 15/708,558

(22) Filed: Sep. 19, 2017

(65) Prior Publication Data

US 2019/0086082 A1   Mar. 21, 2019

(51) Int. Cl.
| | |
|---|---|
| F23R 3/00 | (2006.01) |
| B32B 3/28 | (2006.01) |
| F02C 7/24 | (2006.01) |
| F02K 1/82 | (2006.01) |
| B32B 9/00 | (2006.01) |
| B32B 7/12 | (2006.01) |
| F02C 7/25 | (2006.01) |

(52) U.S. Cl.
CPC .............. F23R 3/002 (2013.01); B32B 3/28 (2013.01); B32B 7/12 (2013.01); B32B 9/005 (2013.01); F02C 7/24 (2013.01); B32B 2307/304 (2013.01); B32B 2607/00 (2013.01); F02C 7/25 (2013.01); F02K 1/822 (2013.01); F02K 1/825 (2013.01); F05D 2260/231 (2013.01); F05D 2300/5024 (2013.01); F05D 2300/603 (2013.01)

(58) Field of Classification Search
CPC .... F02C 7/24; F02C 7/25; F02C 7/045; F02K 1/822; F02K 1/825; F02K 1/827
See application file for complete search history.

(56) References Cited

U.S. PATENT DOCUMENTS

| | | | |
|---|---|---|---|
| 1,855,161 A | | 4/1932 | Wyman |
| 2,020,639 A | * | 11/1935 | Ballenger ................. E04C 2/18 220/DIG. 9 |
| 3,186,896 A | * | 6/1965 | Clem ....................... E02B 3/128 229/5.81 |
| 3,541,636 A | | 11/1970 | Wandel |

(Continued)

FOREIGN PATENT DOCUMENTS

| | | | | |
|---|---|---|---|---|
| GB | 839249 A | * | 6/1960 | ............ F16L 59/026 |
| WO | 02/06049 A1 | | 1/2002 | |

OTHER PUBLICATIONS

Pyrogel XTE—Product Data Sheet—2017.

*Primary Examiner* — Todd E Manahan
*Assistant Examiner* — Todd N Jordan
(74) *Attorney, Agent, or Firm* — W. Mark Bielawki; David J. Oldenkamp

(57) ABSTRACT

A thermal panel having a high temperature side located nearest a source of heat and a low temperature side. The thermal panel includes a corrugated composite material core having hot side ridges and cold side ridges. A hot side skin is attached to the hot side ridges to form a plurality of first cells. A cold side skin is attached to the cold side ridges to form a plurality of second cells. The first cells and second cells are substantially filled with an insulating material that has a thermal conductivity which is lower than the thermal conductivity of the composite material.

13 Claims, 3 Drawing Sheets

(56) References Cited

U.S. PATENT DOCUMENTS

| | | | |
|---|---|---|---|
| 4,227,356 A | | 10/1980 | Stern et al. |
| 4,294,875 A | * | 10/1981 | Schramm .................. B31F 1/24 |
| | | | 428/72 |
| 4,299,872 A | | 11/1981 | Miguel et al. |
| 4,416,715 A | * | 11/1983 | Schramm ............. B29D 24/002 |
| | | | 156/210 |
| 4,564,547 A | | 1/1986 | Hughes |
| 4,567,076 A | | 1/1986 | Therrien |
| 4,662,777 A | * | 5/1987 | Newton ................ E02D 29/124 |
| | | | 404/25 |
| 4,767,656 A | | 8/1988 | Chee et al. |
| 4,964,936 A | | 10/1990 | Ferro |
| 5,154,787 A | | 10/1992 | Gardner et al. |
| 6,114,003 A | | 9/2000 | Gottfried |
| 7,927,686 B2 | * | 4/2011 | Zielinski ................ B64D 33/04 |
| | | | 244/121 |
| 8,293,830 B2 | | 10/2012 | Clarke |
| 8,733,500 B1 | | 5/2014 | Ayle |
| 2010/0304152 A1 | | 12/2010 | Clarke |
| 2012/0308369 A1 | * | 12/2012 | Maheshwari .......... B64D 33/02 |
| | | | 415/182.1 |

\* cited by examiner

THERMAL PANEL WITH A CORRUGATED CERAMIC COMPOSITE SHEET HAVING UNEQUAL RIDGE WIDTHS

BACKGROUND OF THE INVENTION

1. Field of the Invention

The present invention relates generally to thermal insulation systems that are used to protect thermally sensitive structures from damage that might be caused by heat exposure. More particularly, the invention is directed to jet engines and the thermal insulation systems that protect lower temperature structures or bodies in the jet engine from heat generated in the combustion section.

2. Description of Related Art

Jet engines include a combustion or hot section that is located centrally within the engine. The hot section produces large amounts of hot combustion gases. The hot section is surrounded by an annular passageway through which air flows at much colder temperatures. The hot sections of present day jet engines typically operate at temperatures on the order of 500° F. to 750° F. with temperatures as high as 900° F. being possible in order to produce lower emissions and to achieve greater fuel economy.

Thermally sensitive structures and materials that are located near the hot sections must be protected against the relatively high temperatures of the hot section in order to avoid damage. This is a particular problem for composite sound damping structures, such as acoustic honeycomb panels, which are made from composite materials that utilize matrix resins which have maximum operating temperatures on the order of 350° F. to 500° F. The material used to make the acoustic septa that are typically present in such acoustic honeycomb panels may also be damaged when exposed directly to the heat generated by the hot section.

One current approach that is used to protect temperature sensitive jet engine structures from heat generated by the hot section is to place an insulating structure, such as a thermal blanket between the hot section and the structure being protected. The thermal blanket reduces the flow of heat into the temperature sensitive structure to provide the required thermal protection. Thermal blankets, which are commonly referred to as "heat blankets" are typically composed of an inner insulation contained within an inflammable material, such as a steel foil. The insulation is a loose porous or fibrous filler material that is held together within the steel foil blanket by quilting with a heat-resistant thread, such as fiberglass stitching.

Although thermal blankets provide adequate thermal insulation, they do present a number of design challenges. The high vibration environment of a jet engine causes the fiberglass stitching to degrade over time. As a result, the quilted compartments of insulation become undone so that the filler may move within the blanket causing concentration of filler in some areas and leaving other areas unprotected. Accordingly, the service life of a typical thermal blanket is limited and it must be replaced at specified time intervals.

Thermal blankets must also be removed to allow inspection of underlying structures. This removal and reinstallation process is time consuming and many times results in the heat blanket being damaged due to the non-structural nature of the blanket. Repairing and/or replacing a damaged thermal blanket can involve significant added time and costs.

Another approach is to coat the high temperature side of the thermally sensitive structure with high temperature silicone. Such high temperature silicone coatings provide adequate thermal protection. However, the insulating coatings must be scrapped and peeled off in order to inspect the underlying structure. This is a time consuming process that also destroys the coating. A new coating must be applied to the temperature sensitive structure once the inspection has been completed. Application of a new silicone coating is a time consuming process that includes the additional cost of the new high temperature silicone coating material.

There presently is a need to design thermal protection systems for jet engines that provide adequate thermal protection and which are structurally strong so that they last longer than existing thermal blankets. The thermal protection system should also be easy to remove for inspection and easily replaced without damage. These design goals are made particularly difficult due to the unique operating environment of a jet engine and the need to provide lightweight insulating structures that are structurally strong and which can also be formed into complex curved shapes.

SUMMARY OF THE INVENTION

In accordance with the present invention, it was discovered that a thermal panel, which is based on a combination of a structurally strong corrugated core and non-structural insulating material, may be used in place of thermal blankets for protecting thermally sensitive structures in jet engines. The thermal panel is structurally strong in order to avoid the drawbacks associated with non-structural thermal blankets while at the same time providing adequate thermal insulation.

The present invention is directed generally to thermal panels and particularly to thermal panels located around the hot section of a jet engine to protect thermally sensitive structures from this significant source of heat. Thermal panels in accordance with the present invention include a core having a first side located closest to the source of heat and a second side located away from the heat source. The core is composed of a support structure which is a corrugated sheet of composite material. The corrugated sheet has a plurality of hot side ridges located at the first side of the core. The hot side ridges extend in a length direction and have first and second ridge edges that are spaced apart a hot side ridge width. The corrugated sheet also has a plurality of cold side ridges located at the second side of the core. The cold side ridges extend in the length direction and have first and second ridge edges that are spaced apart a cold side ridge width.

The corrugated sheet includes a plurality of first connecting walls that extend in the length direction and which connect the first ridge edges of the hot side ridges to the second ridge edges of the cold side edges. The corrugated sheet further includes a plurality of second connecting; walls that extend in the length direction and which connect the second ridge edges of said hot side ridges to the first ridge edges of the cold side edges. The cold side ridges, first connecting walls and second connecting walls form hot side channels and the hot side ridges, first connecting walls and second connecting walls form cold side channels.

The thermal panel further includes a hot side skin that is attached to the hot side ridges to form a plurality of first cells and a cold side skin is attached to the cold side ridges to form a plurality of second cells. The first cells and second cells are substantially filled with a non-structural insulating material that has a thermal conductivity which is lower than the thermal conductivity of the structural composite material that is used to make the corrugated sheet.

As a feature of the invention, it was discovered that a structurally strong composite corrugated core may be used to support non-structural insulating materials with a minimal reduction in thermal insulation properties. The corrugated core provides structural strength to the thermal panel while at the same time minimizing the number of potential thermally conductive pathways between the hot and cold sides of the panel. The unique combination of structural and thermal properties that is provided by a composite material corrugated core is difficult to obtain with other structural core designs, such as honeycomb.

The invention is directed to the thermal panels and methods for making the panels. The invention is also directed to thermal insulation systems where a thermal panel is releasably attached to a body that requires thermal protection. In addition, the invention covers methods for inspecting such thermal insulation systems where the thermal panel is removed from the body to allow inspection of underlying structures and then replaced.

The above described and many other features and attendant advantages of the present invention will become better understood by reference to the following detailed description when taken in conjunction with the accompanying drawings.

DETAILED DESCRIPTION OF THE INVENTION

The thermal panels of the present invention may be used for insulating a wide variety of heat sensitive structures from a wide variety of heat sources. The thermal panels are well-suited for use in protecting the heat sensitive portions of a jet engine from the heat generated in the combustion (hot) section of the engine. Accordingly, the thermal panels are intended to be used where the heat source has a temperature of from 500° F. to 1000° F. with temperatures of between 600° F. to 750° F. being typical for current jet engines. The thermal protection provided by the thermal panel should be such that the structure or body being thermally protected is exposed to temperatures on the order of 350° F. to 500° F.

The following detailed description is limited to exemplary embodiments of thermal panels that are located within a jet engine. The thermal panels are intended to be used as a replacement for the thermal blankets that are presently commonly used in jet engines to thermally protect heat sensitive engine systems from the engine hot section. Accordingly, the thermal panels may be used in any situation where it is desired to replace a thermal blanket with a structurally strong alternative. It will be understood that the thermal panels of the present invention are not limited to use in jet engines, but may also be used in any situation where a body or structure requires thermal protection from a source of heat.

Figure 1:
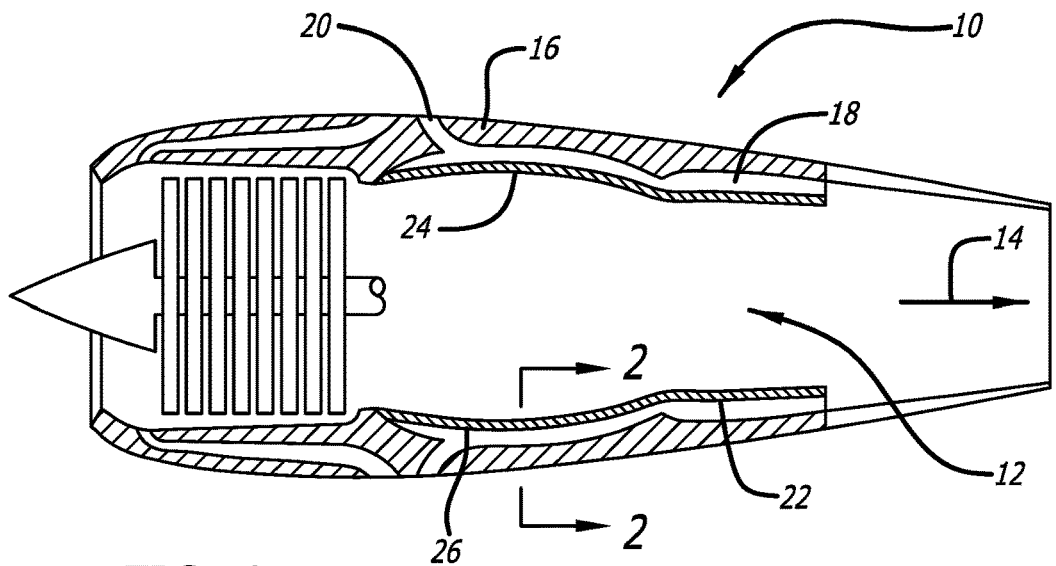
FIG. 1 is a simplified cross-sectional view of a jet engine which shows the location of an exemplary thermal panel in accordance with the present invention.

An exemplary jet engine is shown at 10 in FIG. 1. The jet engine 10 includes a combustion core or hot section 12 which generates a primary hot air flow as represented by arrow 14. The hot air flow within the hot section or high temperature area 12 can be at temperatures ranging from 500° F. to 900° F. and higher depending upon the jet engine type and design. A nacelle structure 16 is located around the hot section 12 to provide an annular duct 18 through which cold secondary air flows as represented by arrow 20. The cold air flow enters the jet engine at a temperature equal to the outside air temperature and is eventually heated as it passes through the annular duct 18 to temperatures that are equal to or slightly less than the temperature of the hot section 12.

An exemplary thermal panel in accordance with the present invention is located in the outer portion of the hot section 12 as shown at 22. The thermal panel 22 includes a high temperature side 24 that is located closest or adjacent to the hot section 12 of the jet engine. The thermal panel 22 also includes a low temperature side 26 that is located away from the source of heat (hot section 12) and adjacent to the cool air duct or low temperature area 18 of the jet engine. The temperature on the low temperature side of the panel is preferably kept in the range of 350° F. to 500° F.

Figure 2:
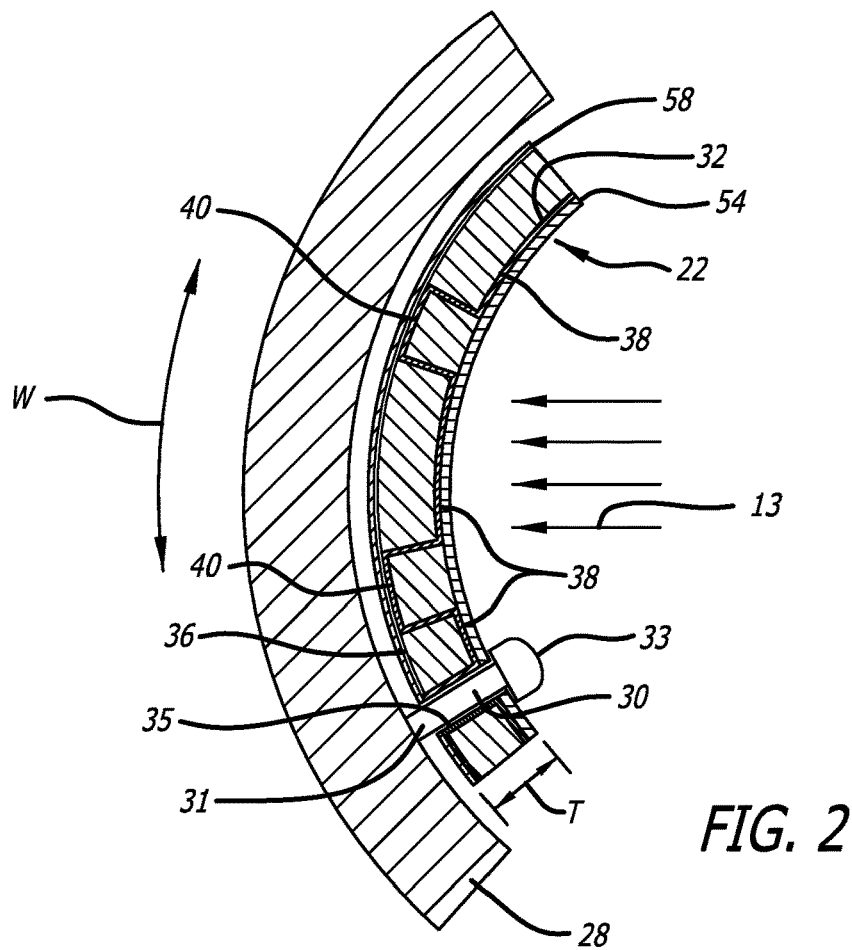
FIG. 2 is a sectional view of FIG. 1 taken in the 2-2 plane showing a more detailed view of a section of the exemplary thermal panel.
Figure 4:
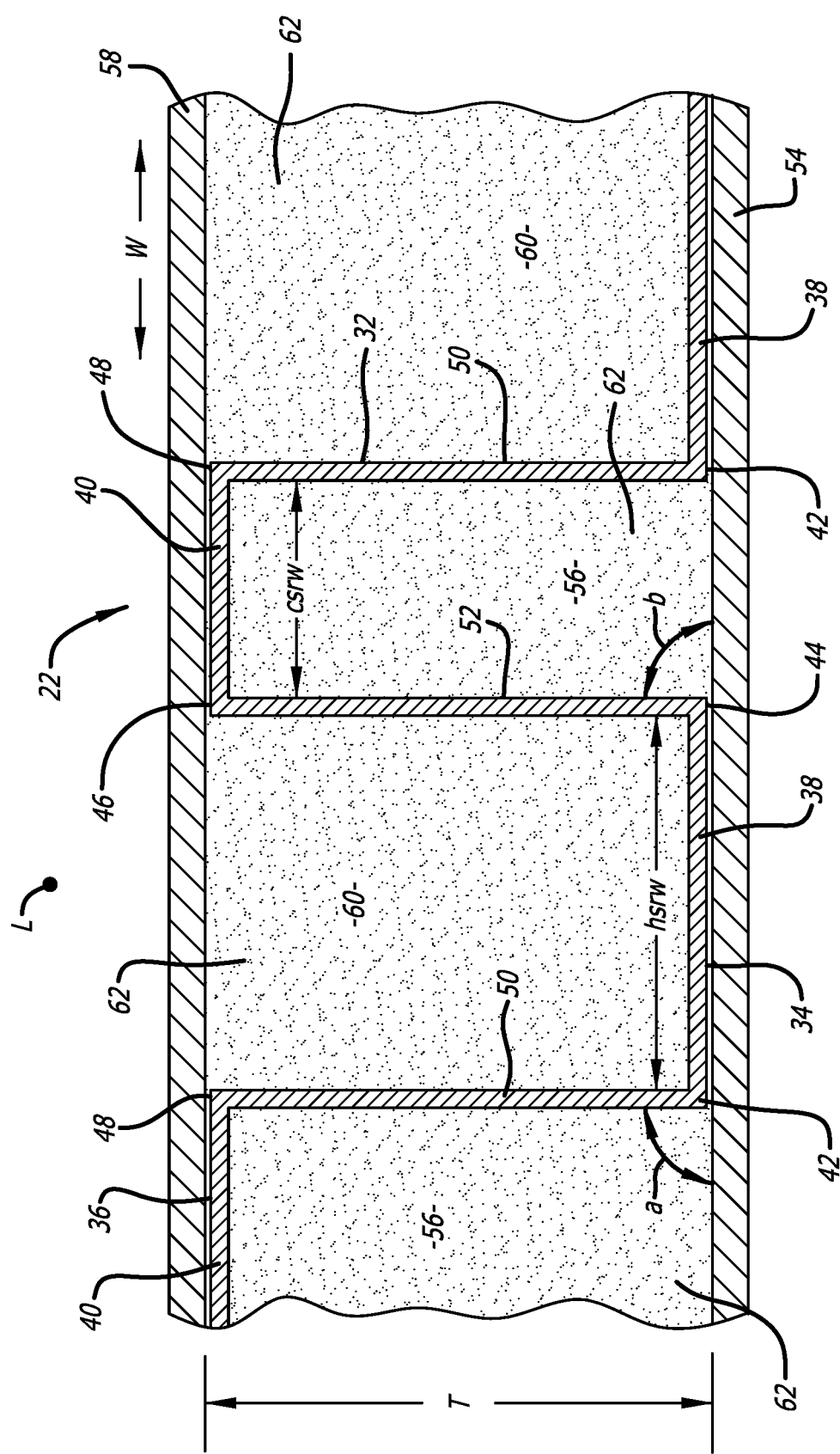
FIG. 4 is a side sectional view of a portion of an exemplary thermal panel in accordance with the present invention.

A detailed simplified cross-sectional view of the thermal panel 22 is shown in FIG. 2. The thermal panel 22 is attached to the nacelle structure or other body 28 of the jet engine that requires thermal protection from the hot section 12. Heat from the hot section is represented by arrows 13. A releasable fastener 30 is used to releasably attach the thermal panel 22 to the body 28. As shown in FIGS. 2 and 4, the thermal panel structure 22 includes a core which is formed from a support structure, such as a corrugated sheet of composite material 32. The core has a first side 34 located closest to the hot section 12 (source of heat) and a second side 36 located away from the hot section 12. The core has a length direction (L), which is perpendicular to the views shown in FIGS. 2 and 4, a width direction (W) and a thickness (T).

The corrugated sheet 32 includes a plurality of hot side ridges 38 located at the first side 34 of the core. The hot side ridges 38 extend in the length direction. Each hot side ridge has a first ridge edge 42 and a second ridge edge 44. The first and second hot side ridge edges 42 and 44 are spaced apart a hot side ridge width (hsrw). The corrugated sheet 32 also includes a plurality of cold side ridges 40 located at the second side 36 of the core. The cold side ridges 40 extend in the length direction. Each cold side ridge has a first ridge edge 46 and a second ridge edge 48. The first and second cold ridge edges 46 and 48 are spaced apart a cold side ridge width (csrw).

The corrugated sheet 32 includes a plurality of first connecting walls 50 that extend in the length direction. The connecting walls 50 connect the first ridge edges 42 of the hot side ridges 38 to the second ridge edges 48 of the cold side ridges 40. The corrugated sheet 32 also includes a plurality of second connecting walls 52 that extend in the length direction. The connecting walls 52 connect the second ridge edges 44 of the hot side ridges 38 to the second ridge edges 46 of the cold side ridges 40.

Figure 5:
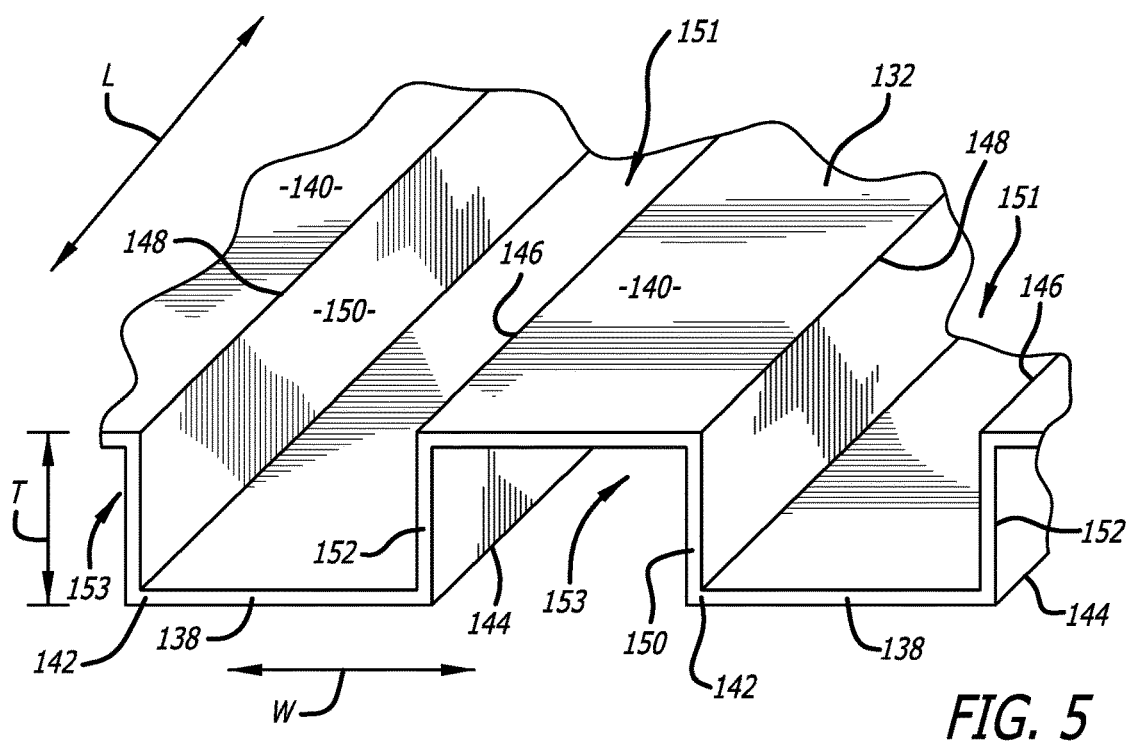
FIG. 5 shows a section of a corrugated sheet of composite material prior to filling of the longitudinal hot side and cold side channels with insulating material.

An exemplary corrugated sheet is shown at 132 in FIG. 5 prior to the corrugated sheet being combined with skins or face sheets and non-structural insulating material to form a thermal panel. The corrugated sheet 132 is the same as the corrugated sheet 32 shown in FIGS. 2 and 4, except that the relative sizes of the hot side ridge widths and cold side ridge widths is different. The last two digits of the identifying numbers in FIG. 5 match the identifying number used in FIGS. 2 and 4 to indicate that identical elements are being identified and that the above description with respect to corrugated sheet 32 also applies to corrugated sheet 132. The number 1 is added to each identifying numeral in FIG. 5 to indicate that the corrugated sheet 132 is not identical to corrugated sheet 32. As shown in FIG. 5, the cold side ridges 140, first connecting walls 150 and second connecting walls 152 form or define longitudinal hot side channels 153. The hot side ridges 138, first connecting walls 150 and second connection walls 152 form or define longitudinal cold side channels 151.

The thermal panel includes a hot side face sheet or skin 54 that is attached to the hot side ridges 38 of the corrugated sheet. The hot side skin 54, first connecting walls 50, second connecting walls 52 and cold side ridges 40 form a plurality of first cells 56 which extend in the length direction. The first cells 56 each have a width measured between the first and second connecting walls and a thickness measured between the hot side skin 54 and cold side ridge 40. The width of the first cell 56 is equal to the cold side ridge width minus the thickness of the connecting walls.

The thermal panel also includes a cold side face sheet or skin 58 that is attached to the cold side ridges 40 of the corrugated sheet. The cold side skin 58, first connecting walls 50, second connecting walls 52 and said hot side ridges 38 form a plurality of second cells 60 which extend in the length direction. The second cells 60 each have a width measured between the first and second connecting walls and a thickness measured between the cold side skin 58 and hot side ridge 38. The width of the second cell 60 is equal to the hot side ridge width minus the thickness of the connecting walls.

The thermal panel includes a non-structural insulating material that substantially fills the first cells 56 and second cells 60. Currently available non-structural insulating materials have a thermal conductivity that is lower than the thermal conductivity of the currently available composite materials that are used to form the corrugated sheet 32. The first or second cells are considered to be substantially filled with insulating material when from 90 to 100 percent of the total volume of each cell is filled with insulating material. It is preferred that from 95 to 100 percent of the total volume of each cell is filled with insulating material. Most preferred is when from 98 to 100 percent of the total volume of each cell is filled with insulating material.

The material used to make the corrugated sheet 32 should be as thermally insulative as possible while at the same time being structurally strong. Thermally conductive materials, such as metals and carbon fiber composites are not suitable. Composite materials composed of low thermal conductivity fibers and a suitable high temperature resin matrix that provide the needed degree of structural strength and thermal insulation properties are suitable. Suitable exemplary low thermal conductivity fibers include glass fibers, silicon carbide fibers, silicon nitride fibers, alumina fibers and mull to fibers. Suitable exemplary matrix resins include silica-based resins, alumina-based resins, polysiloxane resins and polyamide resins. Ceramic composite materials are preferred for making the corrugated sheet. Exemplary ceramic composite materials are described in U.S. Pat. No. 8,293,830 B2, U.S. Pat. No. 5,154,787 and US 2010/0304152 A1, the contents of which is hereby incorporated by reference. A suitable ceramic composite material for making corrugated sheet 32 is available from Flexible Ceramics, Inc. under the tradename High Temperature Prepreg.

The insulating material that is used to fill the first cells 56 and second cells 60 may be any of the non-structural insulating materials that are suitable for use as the insulating material in a jet engine heat blanket. Suitable insulating materials include silicon dioxide aerogels, alumina aerogels, ceramic microporous insulation, mineral wool and ceramic fibers. Preferred insulating materials are available from Aspen Aerogels, Inc., under the tradename Pyrogel®XT, Pyrogel®XTF and Pyrogel®XTE. These insulating materials are composed of amorphous silica which is supported by a nonwoven glass or silica fiber batting. The insulating material should be able to withstand temperatures of up to 1200° F. Another suitable insulating material is Min-K, which is available from Morgan Advanced Thermal, Inc.

The thermal conductivity of the insulating material varies depending upon the temperature at which the thermal conductivity is measured. The standard method for measuring thermal conductivity is ASTM C177. All thermal conductivity values set forth in this specification and the claims are based on and determined by ASTM C177, as currently available publicly. The thermal conductivity of Pyrogel®XTE, as measured by ASTM C177, varies from 0.19 BTU-in/hr-ft$^2$-° F. when measured at 392° F. to 0.44 BTU-in/hr-ft$^2$-° F. when measured at 932° F. It is preferred that the insulating material is a silica aerogel, alumina aerogel or microporous insulation that has a thermal conductivity at 400° F. which is below 0.50 BTU-in/hr-ft$^2$-° F. and a thermal conductivity at 900° F. of less than 1.0 BTU-in/hr-ft$^2$-° F. The density of the insulating material is preferably less than 25 pounds per cubic foot.

The thermal conductivity of the composite material used to make the corrugated sheet 32 is higher than the insulating material. Typical ceramic composite materials have thermal conductivities at 400° F. which are well above 0.50 BTU-in/hr-ft$^2$-° F. The thermal conductivity of ceramic composite materials is typically between 1.0 to 10 BTU-in/hr-ft$^2$-° F. at 400° F. Accordingly, it is preferred that the thickness and design of the corrugated sheet 32 be such that the increase in thermal conductivity through the panel, which is due to the higher thermal conductivity of the corrugated sheet, be kept at a minimum while at the same time providing required structural strength and shape to the panel.

The hot side skin 54 may be made from any of the materials used in high temperature applications as fire barriers. Such materials include stainless steel, nickel alloy foil, Iconel foil, glass fiber/ceramic resin composites and the same materials used to make the corrugated sheet. The hot side skin 54 is intended to protect the core structure of the panel from direct contact with the hot gases formed in the hot section 12.

The cold side skin 58 is not subjected to the high temperatures found on the hot side of the panel. The cold side skin 58 may be made from the same fire barrier-type materials used to make the hot side skin, if desired. Materials that have much lower temperature resistance properties may also be used provided that the service temperature of the material is above at least 350° F. Suitable materials for the cold side skin 58 include carbon fiber composites and glass fiber composites, which are composed of carbon or glass fibers and a thermosetting resin matrix. Carbon fiber composites are preferred because they typically have a high strength to weight ratio and are able to provide structural strength to the panel.

Figure 3:
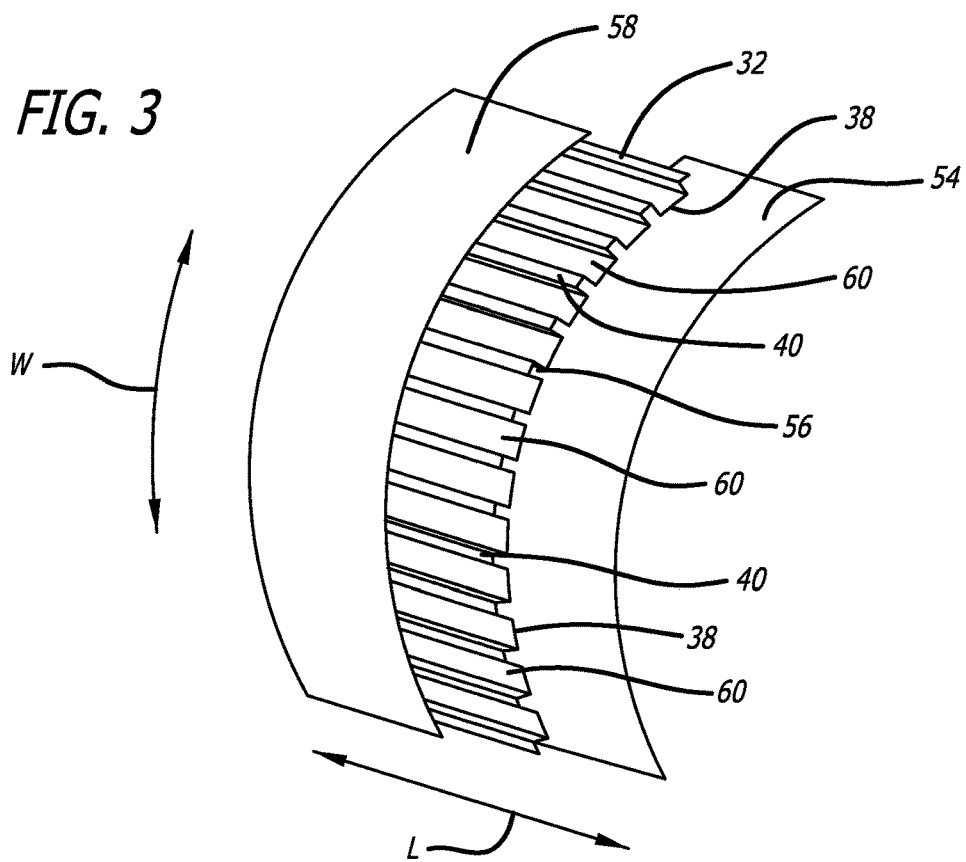
FIG. 3 is an exploded view showing the corrugated core filled with insulating material, the hot side skin and cold side skin prior to their being assembled to form the exemplary thermal panel.

In FIG. 3, the hot side skin 54 and cold side skin 58 are shown prior to bonding of the skins to the corrugated core. The corrugated core includes the corrugated sheet in which the channels have been filled with insulation material. The hot side skin, cold side skin and core are curved in the width direction, preferably prior to bonding, so that the hot side skin forms a concave curved surface relative to the hot section. The skins and core may also be curved in the length direction to provide complex curves which may be necessary to match the geometry of the jet engine hot section.

The hot side skin 54 is preferably bonded to ridges 38 of the corrugated sheet using an appropriate adhesive that has a service temperature which meets or exceeds the temperatures to which the hot side will be exposed. Suitable hot side adhesives include high temperature silicone polymer adhesives, such as RTV-560 and polyimide adhesives, such as FM-57. The cold side skin 58 may be bonded to ridges 40 of the corrugated sheet using the same high temperature adhesive that is used to bond the hot side skins to the corrugated sheet. Alternatively, a lower service temperature adhesive may be used provided that the service temperature of the adhesive meets or exceeds the temperatures to which the cold side skin will be exposed.

A wide variety of corrugated sheet design configurations are possible in order to provide a multitude of different panel shapes having varying degrees of structural strength and thermal insulation properties. For example, all of the hot side ridge widths (hsrw) may be the same or they can, be reduced or increased in certain portions of the corrugated sheet to control structural strength and/or to control the radius of curvature of a concave panel. All of the cold side ridge widths (csrw) may also be the same or they can be reduced or increased in certain portions of the corrugated sheet to control structural strength and/or to control the radius of curvature of a concave panel. The ability to vary and control the location and size of the hot side ridges and cold side ridges provides a significant advantage in designing the shape and character of the thermal panel.

As shown in FIGS. 2-4, the hot side ridge width (hsrw) is larger than the cold side ridge width (csrw). This configuration is useful in situations where it is desirable to maximize the ridge surface area present on the high temperature side of the panel. The advantages of such a configuration include: providing a relatively larger bonding surface area between the hot side skin and hot side ridges; providing increased structural strength on the high temperature side of the panel; and locating a larger portion of the more thermally conductive composite material closer to the hot section.

The corrugated sheet 132 shown in FIG. 5 has hot side ridge widths and cold side ridge widths that are substantially equal. Substantially equal means that the widths are within 10 percent of each other. Cores containing corrugated sheets having hot and cold side widths that are substantially equal is useful in situations where it is desired to have uniform bonding strength between the core and the skins on both sides of the panel and where the equal spacing of the connecting walls provides uniform structural reinforcement and strength throughout the panel. The uniform spacing of the connecting walls also uniformly distributes the added thermal conductance due to the higher thermal conductivity of the walls.

The hot side ridge widths may also be less than the cold side ridge widths in one or more sections of the panel. This configuration is useful in situations where it is desirable to maximize the ridge surface area present on the low temperature side of the panel. The advantages of such a configuration include: providing a relatively larger bonding surface area between the cold side skin and cold side ridges; providing increased structural strength on the low temperature side of the panel; and locating a larger portion of the more thermally conductive composite material further away from the hot section.

The first connecting walls 50 are oriented at an angle "a" that is substantially perpendicular to the hot side skin 54 as shown in FIG. 4. The second connecting walls 52 are oriented and an angle "b" that is also substantially perpendicular to the hot side skin. Substantially perpendicular, when used in connection with describing angle "a" or angle "b" means that the angle is 90°±10°.

The angles "a" and "b" may be reduced or increased from being substantially perpendicular in order to meet design objectives when desired. For example, angle "a" may be less than 90°±10° and angle "b" may also be less than 90°±10°. This configuration increases the length of the thermal pathway between the hot and cold skins that is formed by the first and second connection walls and also reduces the relative size of the cold side ridges. Alternatively, angle "a" may be greater than 90°±10° and angle "b" may also be greater than 90°±10°. This configuration also increases the length of the thermal pathway between the hot and cold skins that is formed by the first and second connection walls and increases the relative size of the cold side ridges.

The angles "a" and "b" may be varied from a substantially perpendicular orientation together, as described above, or they may be varied independent of each other. In addition, different sections of the corrugated sheet may include angles "a" and "b" that are different. The ability to vary and control angles "a" and/or "b" provides a number of design advantages with respect to controlling structural strength, thermal conductivity and panel shape that is difficult to obtain with other core types, such as honeycomb or structural foam.

Exemplary thermal panels were prepared which are designed to be used as a replacement for the thermal blankets being presently used in aircraft jet engines. The corrugated sheets used in all of the exemplary panels were made from "High Temperature Prepreg", which was obtained from Flexible Ceramics, Inc. The prepreg was cured according to the manufacturer's specifications to provide ceramic composite material in the form of corrugated sheets in which the thickness of the composite material was 0.016 inch. In the first two exemplary panels, the hot side ridge width was 1 inch and the cold side ridge width was 0.38 inch. In a third exemplary panel, the hot side ridge width was 1.12 inch and the cold side ridge width was 1 inch. The thickness T of the corrugated sheet core was 0.5 inch for all panels. The thermal conductivity of corrugated sheet cores, with the channels being filled with only air, was 1.4 BTU-in/hr-ft$^2$-° F. at 400° F. As previously mentioned, all thermal conductivities were determined by ASTM C177, as currently publicly available.

The channels of all three exemplary corrugated sheets were substantially filled with Pyrogel®XTE as the insulating material. In the first exemplary panel, the hot side skin was the same ceramic composite that was used to make the corrugated sheet and the cold side skin was a carbon fiber/epoxy composite sheet that was 0.02 inch thick. In the second exemplary panel, stainless steel foil (0.002 inch thick) was used as both the hot side and cold side skins. In the third exemplary panel, stainless steel foil (0.002 inch thick) was also used as both the hot side and cold side skins. In all three exemplary panels, the hot side skins and cold side skins were bonded to their respective hot side ridges and cold side ridges using RTV-560 adhesive.

The thermal conductivity of the first panel was 0.34 BTU-in/hr-ft$^2$-° F. at 400° F. The thermal conductivity of the second panel was 0.30 BTU-in/hr-ft$^2$-° F. at 400° F. The thermal conductivity of the third panel was 0.28 BTU-in/hr-ft$^2$-° F. at 400° F. All of the panel thermal conductivities are only marginally above the thermal conductivity of the insulating material, which is 0.19 BTU-in/hr-ft$^2$-° F. The observed slight reduction in thermal conductivity between the second and third exemplary panels is believed to be due to the lower number of connecting walls which results from the cold side ridge width being greater in the third exemplary panel. Accordingly, it is preferred that the number of connecting walls in the panel be limited as much as possible while still providing enough connecting walls to ensure that the thermal panel has sufficient structural strength to maintain the structural integrity of panel during use in a jet engine.

The dimensions and configurations of the thermal panels may be varied widely depending upon the intended use of the panel. The preferred use is as a replacement for the thermal blankets commonly used in jet engines. Accordingly, the thickness T of the core is preferably in the range, of from 0.3 inch to 2 inches. The weight of the thermal panel is preferably from 0.5 to 2 pounds per square foot. The composite material used to make the corrugated sheet is preferably from 0.01 inch to 0.03 inch thick. The hot side ridge widths and cold side ridge widths are preferably in the range of from 0.25 inch to 2 inches.

Multiple thermal panels are required to surround the hot section of the jet engine. The panels are preferably shaped so that the hot side skin forms a concave curve in the width direction of the panel with respect to the hot section. The radius of curvature of the concave curve for thermal panels used in a large jet engine will be typically between 3 feet and 7 feet.

The thermal panels in accordance with the present invention are particularly well suited for use as a replacement for jet engine thermal blankets where removal and replacement is required during routine inspections of underlying structures. The inherent structural strength of the thermal panels and their ability to retain shape during removal from the jet engine and replacement are desirable features not found in thermal blankets.

The thermal panel may be releasably attached to the jet engine using a variety of releasable attachment mechanisms. As shown in FIG. 2, a releasable fastener 30 provides a simple and effective way to attach the thermal panel to the underlying jet engine body so that the panel can be easily removed for inspection and replaced. The attachment end 31 of the fastener is threaded or otherwise configured for releasable attachment to the body 28. The anchor portion or head portion 33 of the fastener is exposed or located so that it can be accessed from the hot section during removal and reinstallation of the fastener.

A panel attachment opening 35 extends through the panel and receives the fastener 30. The area around the panel attachment opening may be reinforced, if desired. However, in order to reduce the complexity of the structure and to keep weight at a minimum, the corrugated sheet itself may be oriented to provide inherent reinforcement at the panel attachment opening. This is accomplished by locating the panel attachment opening so that it extends through the hot side ridge 38, as shown in FIG. 2. The hot side ridge provides extra support surrounding the panel attachment opening on the high temperature side of the panel. Alternatively, the panel attachment opening may be located so that it extends through the cold side ridge 40. This configuration provides added reinforcement around the panel attachment opening on the low temperature side of the panel.

Only one fastener 30 has been shown in FIG. 2 for demonstrative purposes. It will be understood that many releasable fasteners are required to releasably secure the thermal panel within the jet engine. All of the panel attachment openings for the multiple fasteners may be located so that they extend through a hot side ridge. However, some of the panel attachment openings may also be located so that they extend through the cold side ridges in sections of the panel where it is necessary to reinforce the area around the attachment openings on the low temperature side of the panel.

The inspection method used when a thermal panel has been installed in a jet engine is basically the same as the current methods used to inspect engine areas covered by a thermal blanket. The inspection method involves removing the releasable fasteners so that the panel can be moved away from the underlying engine a sufficient distance to allow inspection of the underlying structure or body. After completion of the inspection, the thermal panel is moved back into position and fastened in place with the releasable fasteners.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited by the above-described embodiments, but is only limited by the following claims.

What is claimed is:

1. A thermal panel for use near a source of heat having a high temperature side located nearest said source of heat and a low temperature side located away from said source of heat, said thermal panel comprising:

A) a core having a first side located closest to said source of heat and a second side located away from said source of heat, said core having a length direction, a width direction and a thickness, said core comprising a support structure comprising a corrugated sheet of ceramic composite material wherein said corrugated sheet comprises a plurality of hot side ridges located at the first side of said core, said hot side ridges defining a hot side ridge surface area, said hot side ridges extending in said length direction and having first and second ridge edges that are spaced apart a hot side ridge width, said corrugated sheet comprising a plurality of cold side ridges located at the second side of said core, said cold side ridges defining a cold side ridge surface area, said cold side ridges extending in said length direction and having first and second ridge edges that are spaced apart a cold side ridge width, said corrugated sheet comprising a plurality of first connecting walls that extend in said length direction and which connect the first ridge edges of said hot side ridges to the second ridge edges of said cold side ridges, said corrugated sheet comprising a plurality of second connecting walls that extend in said length direction and which connect the second ridge edges of said hot side ridges to the first ridge edges of said cold side ridges, wherein said cold side ridges, first connecting walls and second connecting walls define longitudinal hot side channels and wherein said hot side ridges, first connecting walls and second connecting walls define longitudinal cold side channels;

B) a hot side skin attached to said hot side ridges wherein said hot side skin, first connecting walls, second connecting walls and said cold side ridges form a plurality of first cells which extend in the length direction, said first cells each having a width measured between said first and second connecting walls and a thickness measured between said hot side skin and cold side ridge, said hot side skin being a metal foil; and C) a cold side skin attached to said cold side ridges wherein said cold side skin, first connecting walls, second connecting walls and said hot side ridges form a plurality of second cells which extend in the length direction, said second cells each having a width measured between said first and second connecting walls and a thickness measured between said cold side skin and hot side ridge, said first cells and second cells being substantially filled with an insulating material selected from the group consisting of silicon dioxide aerogels, alumina aerogels, ceramic microporous insulation, mineral wool, ceramic fibers and amorphous silica which is supported by a nonwoven glass or silica fiber and wherein said hot side ridge widths are greater than said cold side ridge widths such that said hot side ridge surface area is greater than said cold side ridge surface area.

2. The thermal panel according to claim 1 wherein said hot side skin is curved in said width direction to form a concave curved surface relative to said source of heat.

3. The thermal panel according to claim 1 wherein said first connecting walls are substantially perpendicular to said hot side skin.

4. The thermal panel according to claim 1 wherein said second connecting walls are substantially perpendicular to said hot side skin.

5. The thermal panel according to claim 3 wherein said second connecting walls are substantially perpendicular to said hot side skin.

6. A jet engine comprising the thermal panel according to claim 1.

7. A thermal insulation system comprising the thermal panel according to claim 1 wherein the low temperature side of said thermal panel is located adjacent to a body requiring thermal protection and wherein said thermal panel is releasably attached to said body with one or more releasable fasteners.

8. The thermal insulation system according to claim 7 wherein said releasable fastener comprises an attachment end for releasably attaching to said body and an anchor portion for releasably attaching to said thermal panel and wherein said thermal panel includes a surface defining a panel attachment opening extending from the high temperature side of said thermal panel to the lower temperature side of said thermal panel for receiving said releasable fastener.

9. The thermal insulation system according to claim 8 wherein said panel attachment opening extends through said hot side ridge.

10. The thermal insulation system according to claim 8 wherein said panel attachment opening extends through said cold side ridge.

11. A jet engine comprising the thermal insulation system according to claim 7.

12. A method for making a thermal panel for use near a source of heat having a high temperature side located nearest said source of heat and a low temperature side located away from said source of heat, said method comprising the steps of:

A) providing a core having a first side located closest to said source of heat and a second side located away from said source of heat, said core having a length direction, a width direction and a thickness, said core comprising a support structure comprising a corrugated sheet of ceramic composite material wherein said corrugated sheet comprises a plurality of hot side ridges located at the first side of said core, said hot side ridges defining a hot side ridge surface area, said hot side ridges extending in said length direction and having first and second ridge edges that are spaced apart a hot side ridge width, said corrugated sheet comprising a plurality of cold side ridges located at the second side of said core, said cold side ridges defining a cold side ridge surface area, said cold side ridges extending in said length direction and having first and second ridge edges that are spaced apart a cold side ridge width, said corrugated sheet comprising a plurality of first connecting walls that extend in said length direction and which connect the first ridge edges of said hot side ridges to the second ridge edges of said cold side ridges, said corrugated sheet comprising a plurality of second connecting walls that extend in said length direction and which connect the second ridge edges of said hot side ridges to the first ridge edges of said cold side ridges, wherein said cold side ridges, first connecting walls and second connecting walls define longitudinal hot side channels and wherein said hot side ridges, first connecting walls and second connecting walls define longitudinal cold side channels;

B) providing a hot side skin and attaching said hot side skin to said hot side ridges wherein said hot side skin, first connecting walls, second connecting walls and said cold side ridges form a plurality of first cells which extend in the length direction, said first cells each having a width measured between said first and second connecting walls and a thickness measured between said hot side skin and cold side ridge, said hot side skin being a metal foil; and C) providing a cold side skin and attaching said cold side skin to said cold side ridges wherein said cold side skin, first connecting walls, second connecting walls and said hot side ridges form a plurality of second cells which extend in the length direction, said second cells each having a width measured between said first and second connecting walls and a thickness measured between said cold side skin and hot side ridge, said first cells and second cells being substantially filled with an insulating material selected from the group consisting of silicon dioxide aerogels, alumina aerogels, ceramic microporous insulation, mineral wool, ceramic fibers and amorphous silica which is supported by a nonwoven glass or silica fiber and wherein said hot side ridge widths are greater than said cold side ridge widths such that said hot side ridge surface area is greater than said cold side ridge surface area.

13. A method comprising the step of installing the thermal panel according to claim 1 into a jet engine.

* * * * *